(12) United States Patent
Chern

(10) Patent No.: US 7,584,525 B2
(45) Date of Patent: Sep. 8, 2009

(54) HINGE ASSEMBLY

(76) Inventor: Jr-Jiun Chern, 8F-5, No. 6, Ta Tun 16th Street, Nan Tun District, Taichung (TW)

( * ) Notice: Subject to any disclaimer, the term of this patent is extended or adjusted under 35 U.S.C. 154(b) by 191 days.

(21) Appl. No.: 11/762,175

(22) Filed: Jun. 13, 2007

(65) Prior Publication Data

US 2008/0307605 A1     Dec. 18, 2008

(51) Int. Cl.
    *E05C 17/54*     (2006.01)
(52) U.S. Cl. .......................... 16/342; 16/386
(58) Field of Classification Search .................. 16/342, 16/341, 337, 380, 374, 386; 361/680–682, 361/679.27; 248/919–923; 379/433.13; 455/575.3
    See application file for complete search history.

(56) References Cited

U.S. PATENT DOCUMENTS

| 2005/0034274 | A1* | 2/2005  | Wu         | 16/342 |
| 2006/0272129 | A1* | 12/2006 | Rude et al.| 16/342 |
| 2007/0143963 | A1* | 6/2007  | Chern      | 16/342 |
| 2008/0151476 | A1* | 6/2008  | Chern      | 361/681|
| 2008/0151477 | A1* | 6/2008  | Chern      | 361/681|
| 2008/0151478 | A1* | 6/2008  | Chern      | 361/681|
| 2008/0263826 | A1* | 10/2008 | Huang      | 16/342 |
| 2009/0013498 | A1* | 1/2009  | Chern      | 16/223 |

OTHER PUBLICATIONS

TW M 288490, Six (6) pages.

* cited by examiner

*Primary Examiner*—William L. Miller
(74) *Attorney, Agent, or Firm*—Alan Kamrath; Kamrath & Associates PA

(57) ABSTRACT

A hinge assembly includes a body member having a mounting tab and a housing adapted to receive a plug. The plug is locked in the housing such that the plug is not rotatable relative to the housing. The hinge assembly also includes an elastomeric sleeve having two, flat, first peripheral surfaces, two, arcuate, second peripheral surfaces and a slit. A pintle includes a mounting tab and a connecting rod, with the connecting rod adapted to be inserted in the elastomeric sleeve. The connecting rod includes a cylindrical outer surface having a flat surface formed thereon. The flat surface corresponds with one of the first, flat, peripheral surfaces. The cylindrical outer surface corresponds with the second, arcuate, peripheral surfaces. The elastomeric sleeve and slit are expanded out by the pintle when the pintle rotates.

19 Claims, 19 Drawing Sheets

HINGE ASSEMBLY

BACKGROUND OF THE INVENTION

1. Field of the Invention

The present invention relates to a hinge assembly for use in computing devices such as notebook computers.

2. Description of the Related Art

Typically, a user has to engage two hands to open a notebook computer, with one hand holding a keyboard while the other hand pivoting a display screen so as to eliminate lifting the keyboard off a flat surface.

Taiwan Pat. No. M288490 discloses a flat spring hinge 20 that enables the user to encounter less resistive force to move the notebook computer to an open position with the display and keyboard exposed for use than to move the notebook computer to a closed position with the display against the keyboard. The flat spring hinge 20 includes a cylindrical wall 23 wrapping at least substantially circumferentially around the longitudinal portion of a pintle 22. When the pintle 22 rotates counter to the direction of wrap of the flat spring hinge 20 to open the notebook computer, a resistive force provided by the interaction between the pintle 22 and the flat spring hinge 20 is lower than that when the pintle 22 rotates in the opposite direction with respect to the friction member. However, the flat spring hinge 20 gets fatigued and does not provide as much resistive force as necessary to allow the user to fully open the notebook computer easily and to rotate the display to a desired position relative to the keyboard after a repetitive use.

The present invention is, therefore, intended to obviate or at least alleviate the problems encountered in the prior art.

SUMMARY OF THE INVENTION

A hinge assembly incorporated in a notebook computer includes a body member having a mounting tab and a housing adapted to receive a plug. The plug is locked in the housing such that the plug is not rotatable relative to the housing. The hinge assembly also includes an elastomeric sleeve having a first and a second portion. The second portion has two, flat, first peripheral surfaces, two, arcuate, second peripheral surfaces and a slit. A pintle includes a mounting tab and a connecting rod, with the connecting rod adapted to be inserted in the elastomeric sleeve. The connecting rod includes a cylindrical outer surface having a flat surface formed thereon. The flat surface corresponds with one of the first, flat, peripheral surfaces. The cylindrical outer surface corresponds with the second, arcuate, peripheral surfaces. Said elastomeric sleeve and slit are expanded out by the pintle when the pintle rotates.

It is an objective of the hinge assembly to have resistive forces provided by the interaction of the connecting rod and the first and second portions so that the hinge assembly allows a user to open the notebook computer easily.

It is another objective of the present invention to provide a positioning device adapted to limit the rotational range of the notebook computer.

Other objectives, advantages, and novel features of the invention will become more apparent from the following detailed description when taken in conjunction with the accompanying drawings.

BRIEF DESCRIPTION OF THE DRAWINGS

For the present disclosure to be easily understood and readily practiced, the present disclosure will now be described for the purpose of illustration but not limitation, in conjunction with the following figures, wherein.

DETAILED DESCRIPTION OF THE PREFERRED EMBODIMENT

Figure 7:
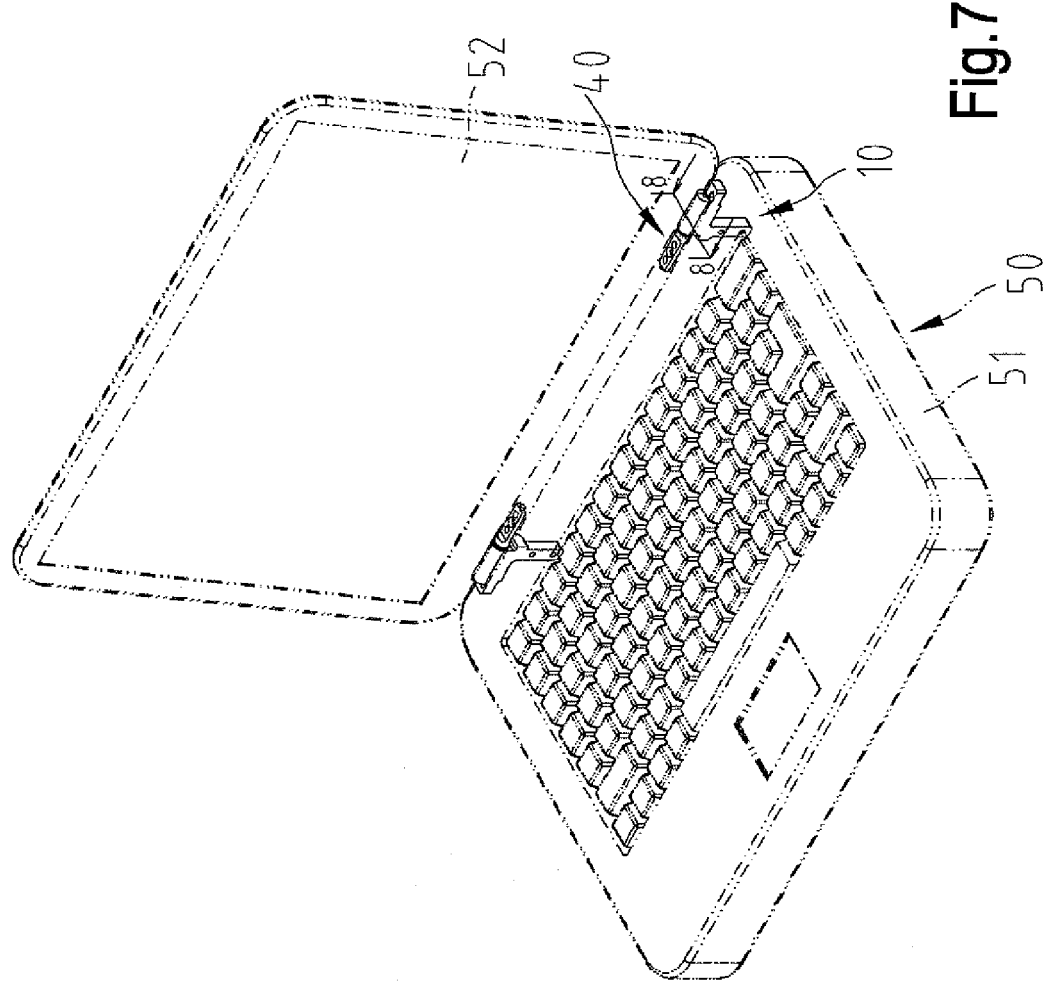
FIG. 7 is a diagrammatic representation of a notebook computer incorporating two hinge assemblies in accordance with the first embodiment of the present invention, with the notebook computer shown in phantom.
Figure 8:
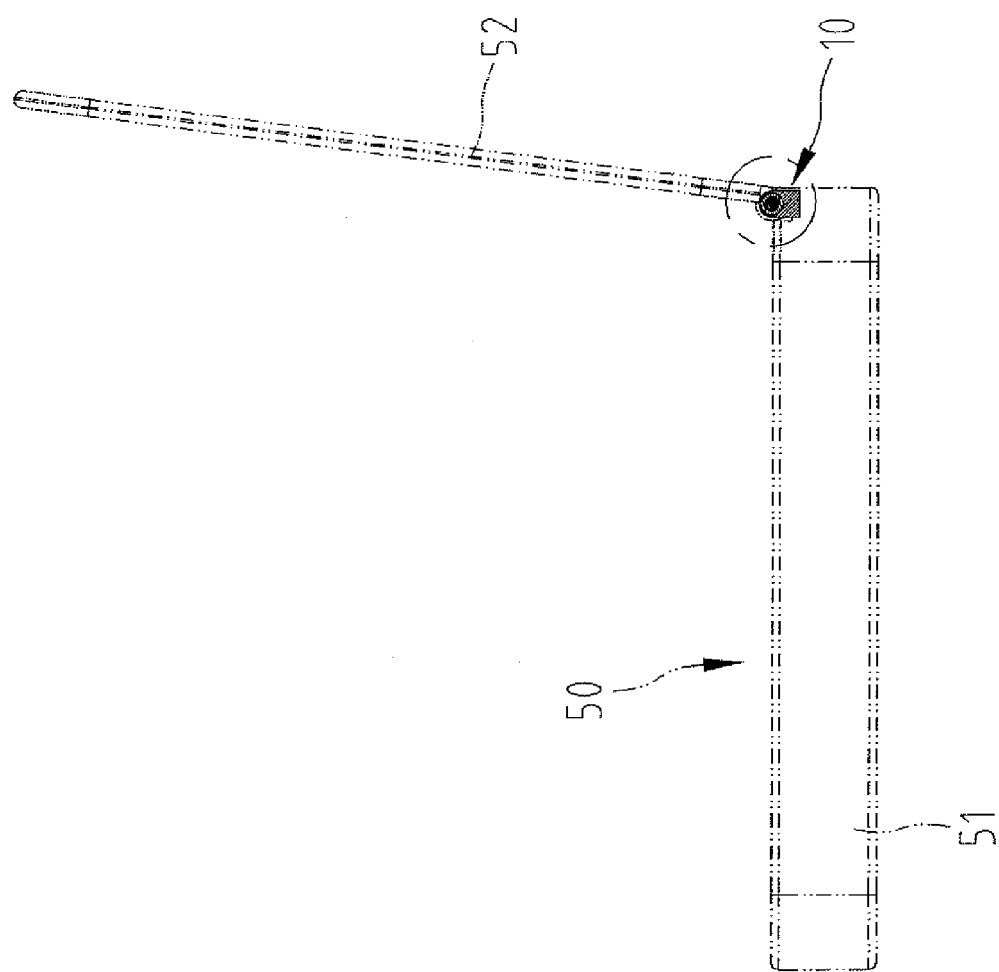
FIG. 8 is a cross-sectional view taken along line 8-8 of FIG. 7
Figure 9:
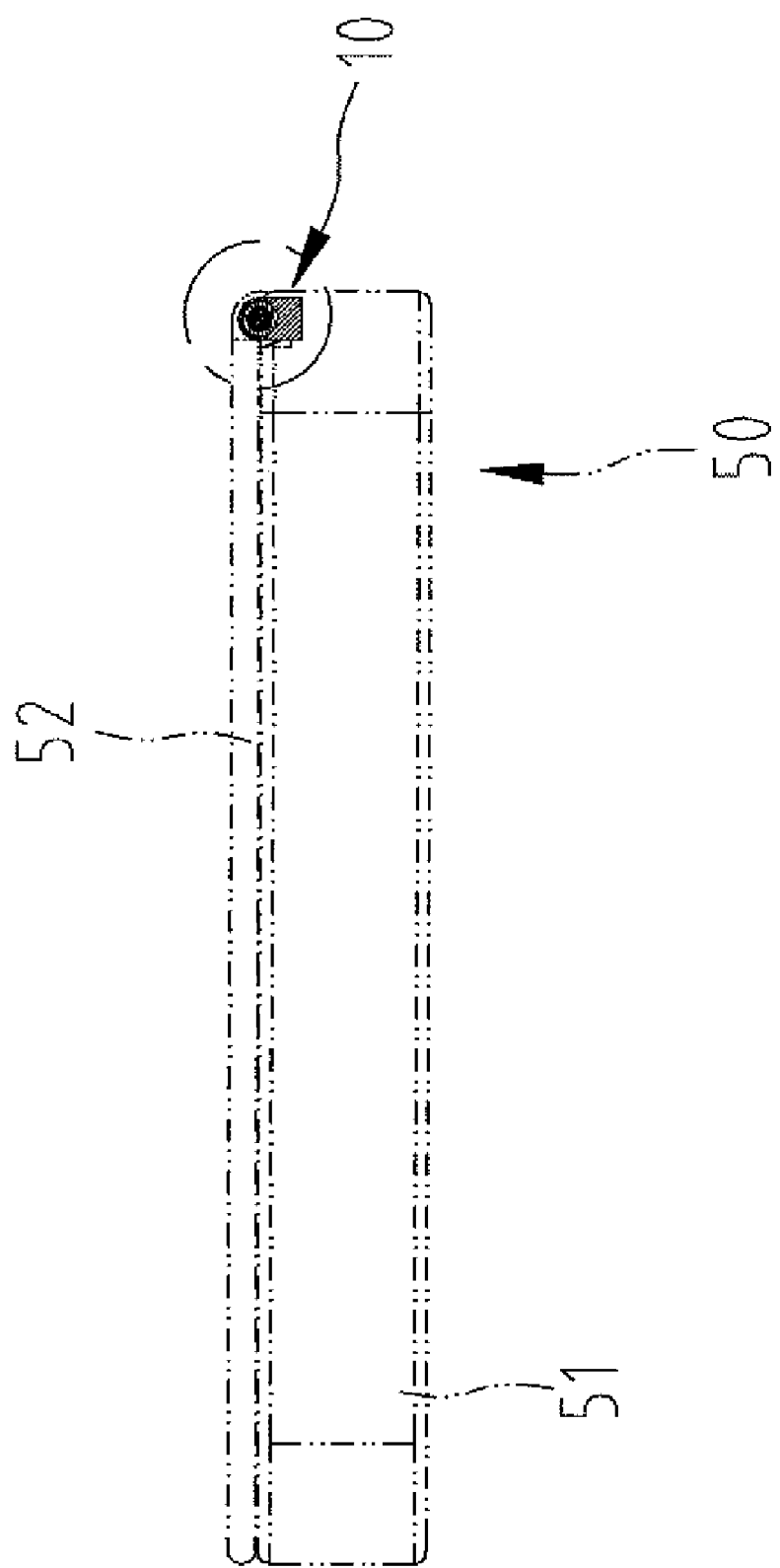
FIG. 9 is a cross-sectional view similar to FIG. 8, illustrating the notebook computer in another position.

Referring to FIGS. 1-4 and in conjunction with FIG. 7, a hinge assembly in accordance with the first embodiment of the present invention includes a body member 10, a plug 20, an elastomeric sleeve 30 and a pintle 40. The body member 10 includes a mounting tab 11 for attachment with a base assembly 51 of a notebook computer 50 and a housing 12 disposed at a right angle thereto. The housing 12 includes a first tabular section 13 and a second tabular section 14 therein, with the first and second tabular sections 13, 14 interconnecting with one another. The first tabular section 13 has a bigger internal radius than the second tabular section 14. The housing 12 is adapted to receive the plug 20.

The plug 20 includes a connecting end 21 compatible with the first tabular section 13 and a receiving end 22 compatible with the second tabular section 14. The connecting end 21 includes a plurality of grooves 211 formed along the axis thereof for easy insertion into the first tabular section 13. The receiving end 22 includes a cavity 221 therein adapted for receiving the elastomeric sleeve 30.

The elastomeric sleeve 30 includes a first portion 31 with a polygonal cross section and corners that are substantially arcuate. The elastomeric sleeve 30 also includes a second portion 32 having two, flat, first peripheral surfaces 321, two, arcuate, second peripheral surfaces 322. The second portion 32 has two protuberances 324 formed thereon for locking the elastomeric sleeve 30 such that the elastomeric sleeve 30 is not moveable relative to the plug 20. A slit 33 is formed from the first portion 31 to the second portion 32 and is disposed in the axial direction of the elastomeric sleeve 30. In this embodiment, the slit 33 is substantially Z-shaped. Furthermore, a cutout 323 is defined between the first and second portions 31, 32 and is disposed transversely so that conformity is obtained in shape in the transition from the first portion 31 to the second portion 32.

The pintle 40 includes a mounting tab 41 for attachment with a display assembly 52 of the notebook computer 50 and a connecting rod 42 engagable with the elastomeric sleeve 30. The connecting rod 42 has a cylindrical outer surface 421 with a flat surface 422 formed at an end thereof and with a channel 423 formed at an opposite end thereof for retaining an oil lubricant.

Figure 1:
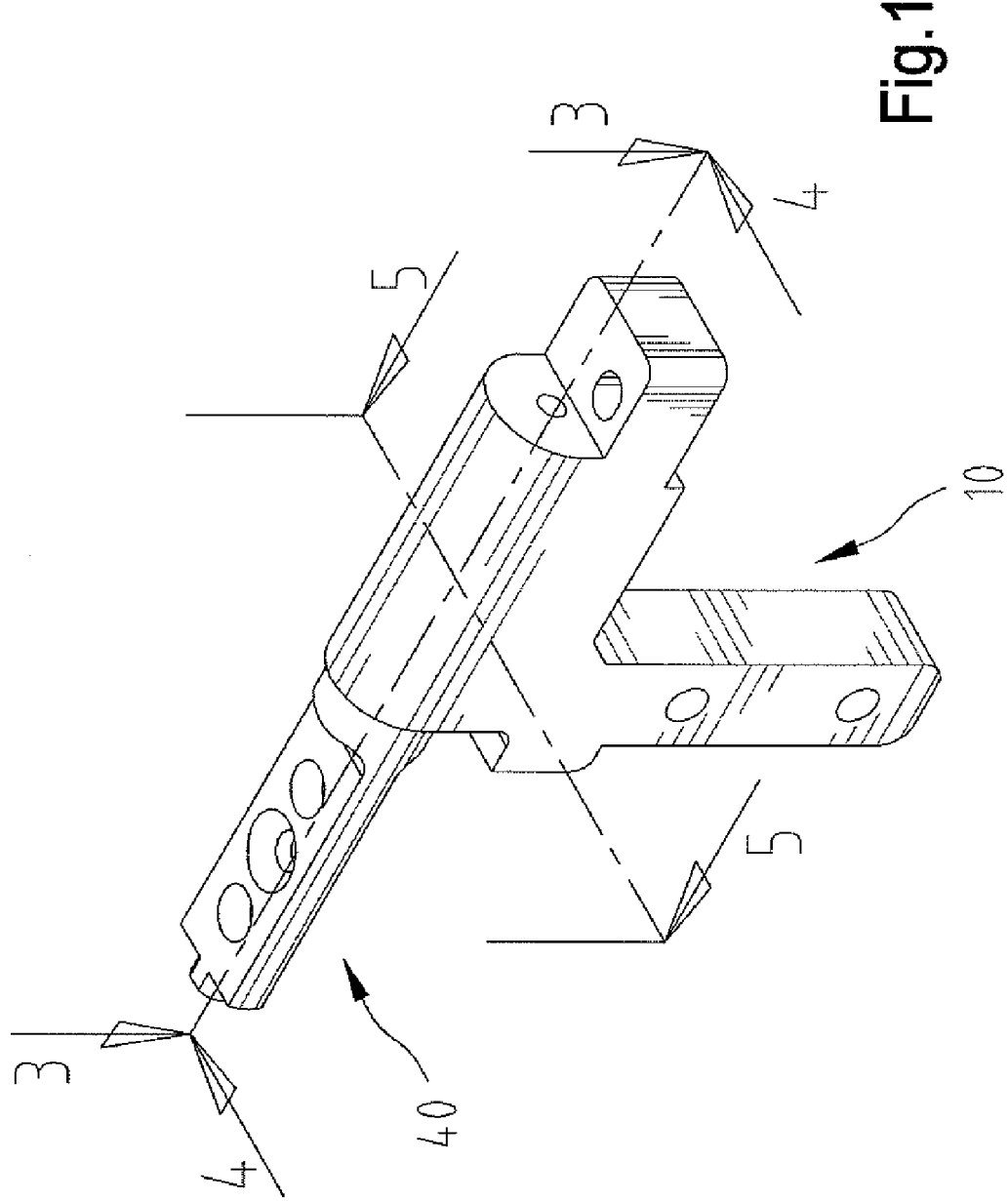
FIG. 1 is a perspective view of a hinge assembly in accordance with the first embodiment of the present invention.
Figure 2:
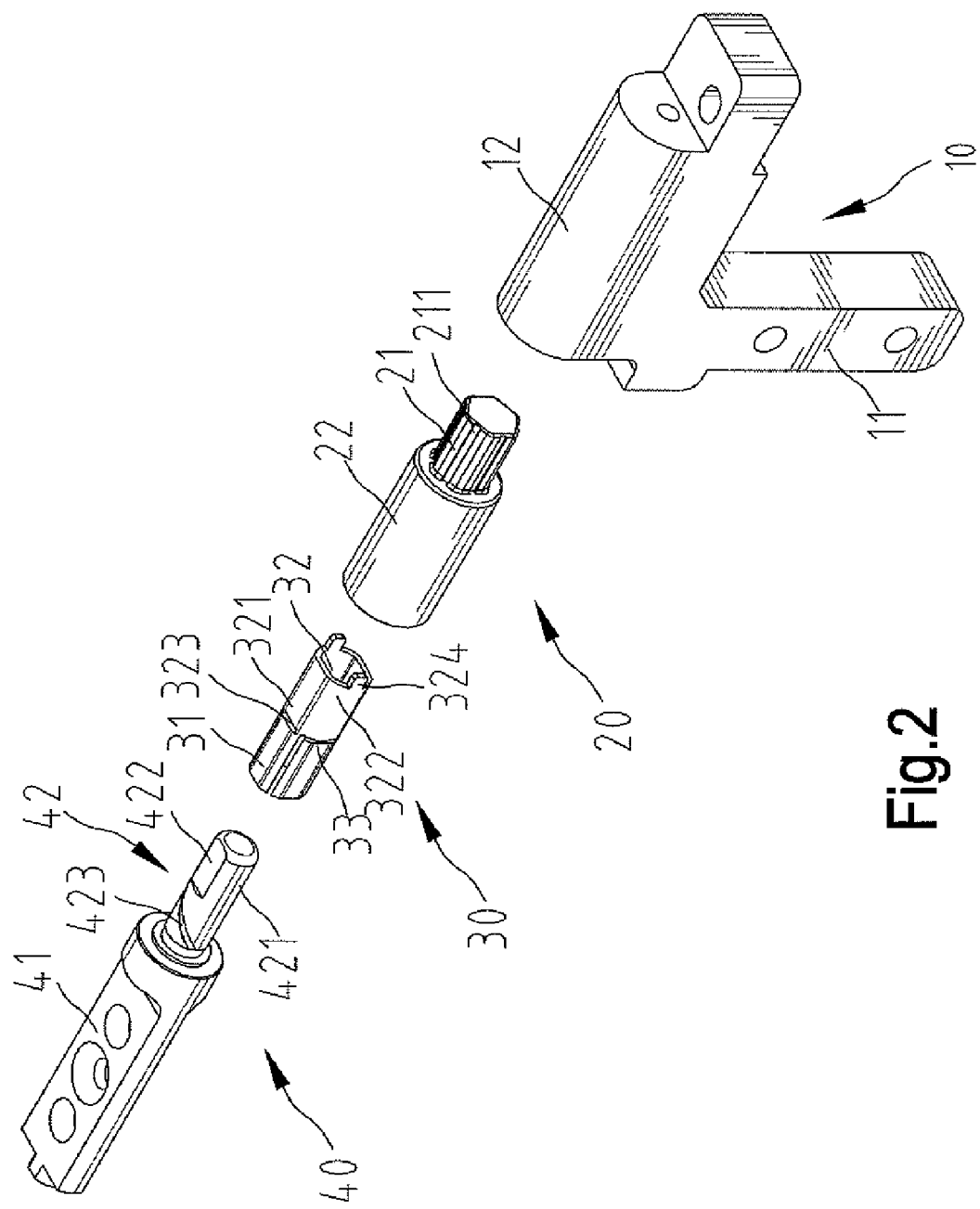
FIG. 2 is an exploded perspective view of FIG. 1.
Figure 3:
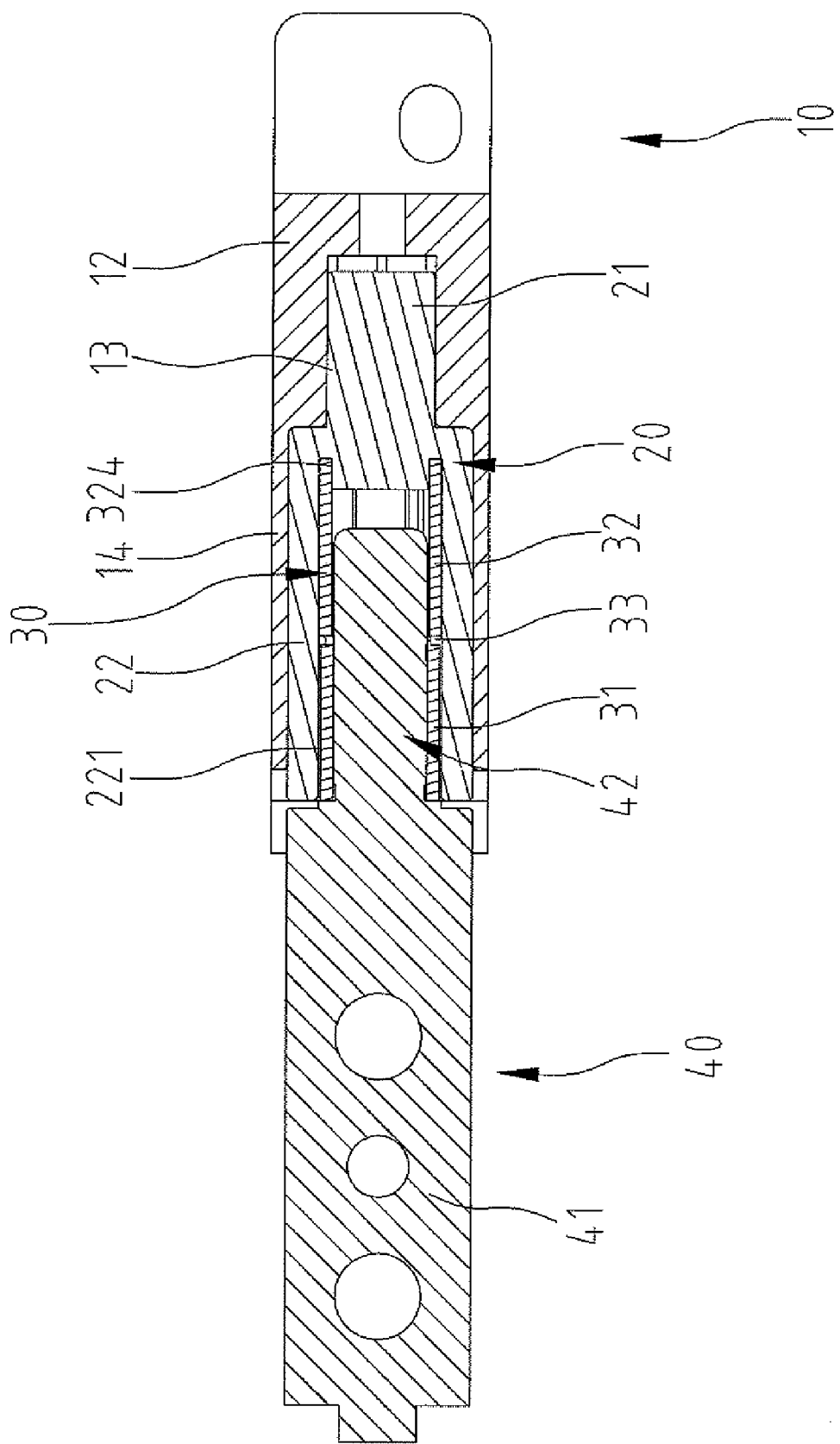
FIG. 3 is a cross-sectional view taken along line 3-3 of FIG. 1.
Figure 4:
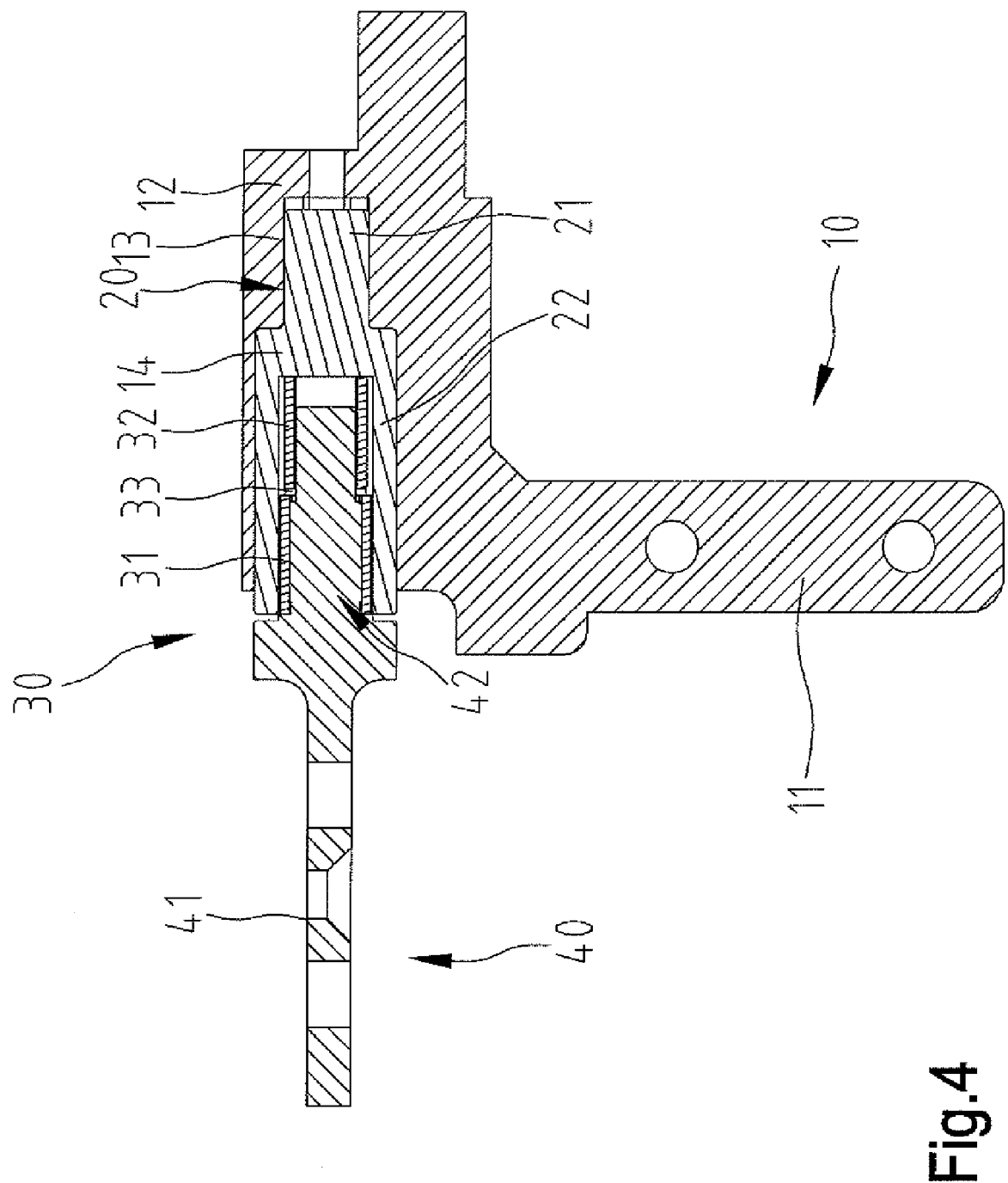
FIG. 4 is a cross-sectional view taken along line 4-4 of FIG. 1.
Figure 5:
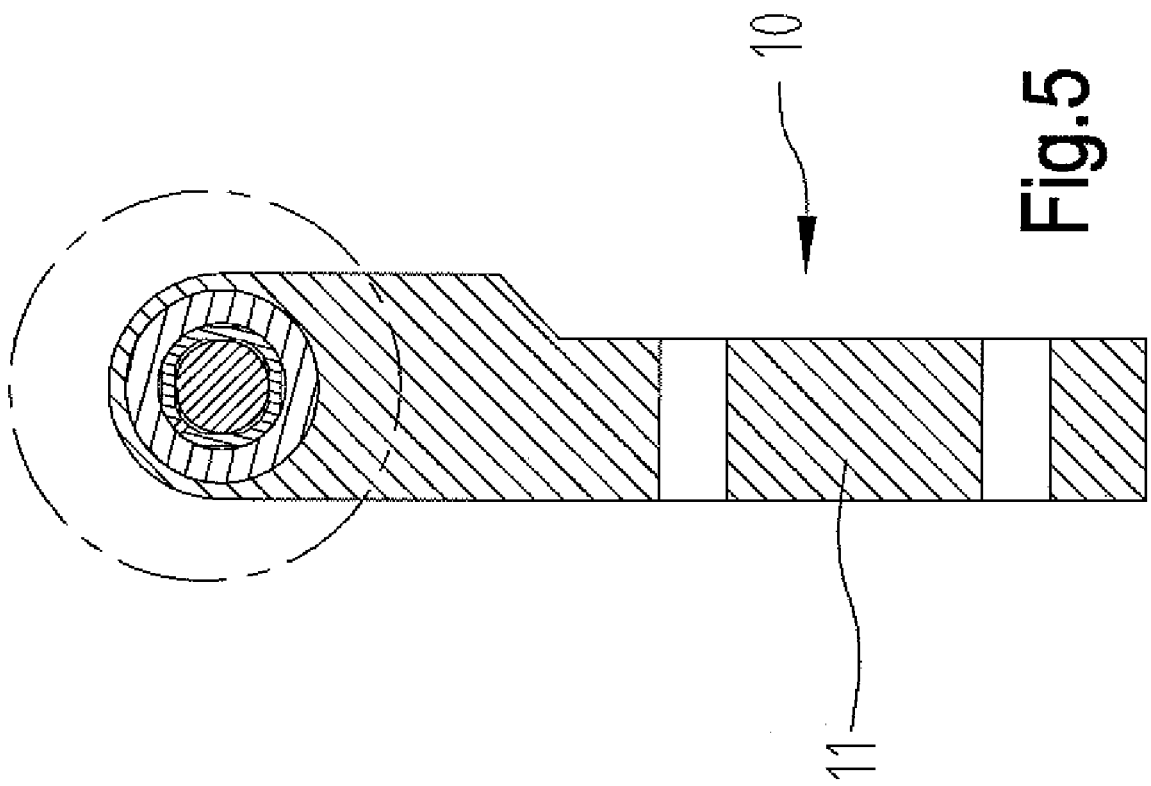
FIG. 5 is a cross-sectional view taken along line 5-5 of FIG. 1.
Figure 6:
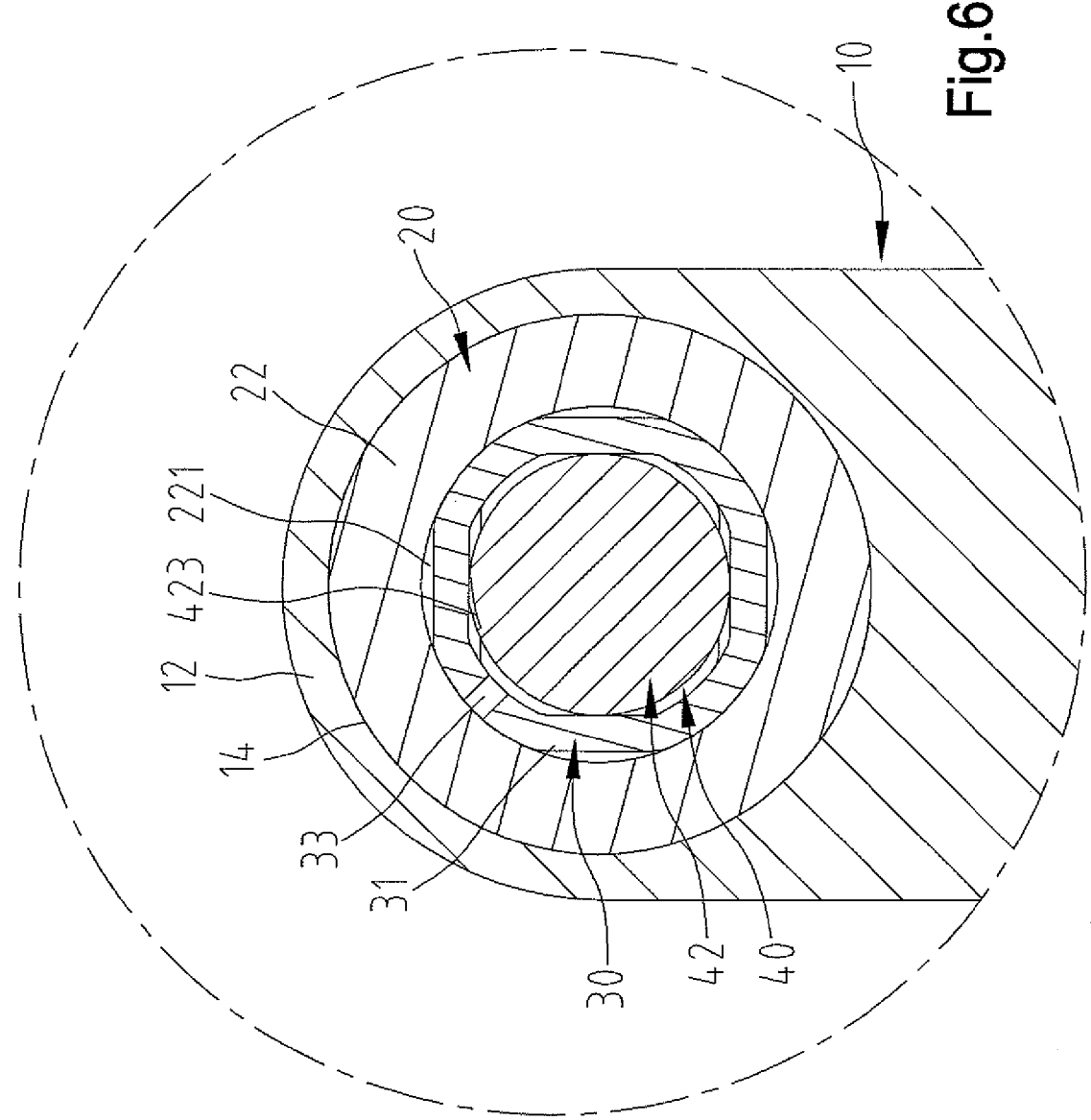
FIG. 6 is a partial, enlarged view of FIG. 5.

Referring to FIGS. 5 and 6, the connecting rod 42 has four points of contact with the first portion 31 of the elastomeric sleeve 30, such that a frictional force is provided by the interaction of the connecting rod 42 and the first portion 31. The slit 33 enables the connecting rod 42 to easily rotate with respect to the elastometric sleeve 30.

Figure 10:
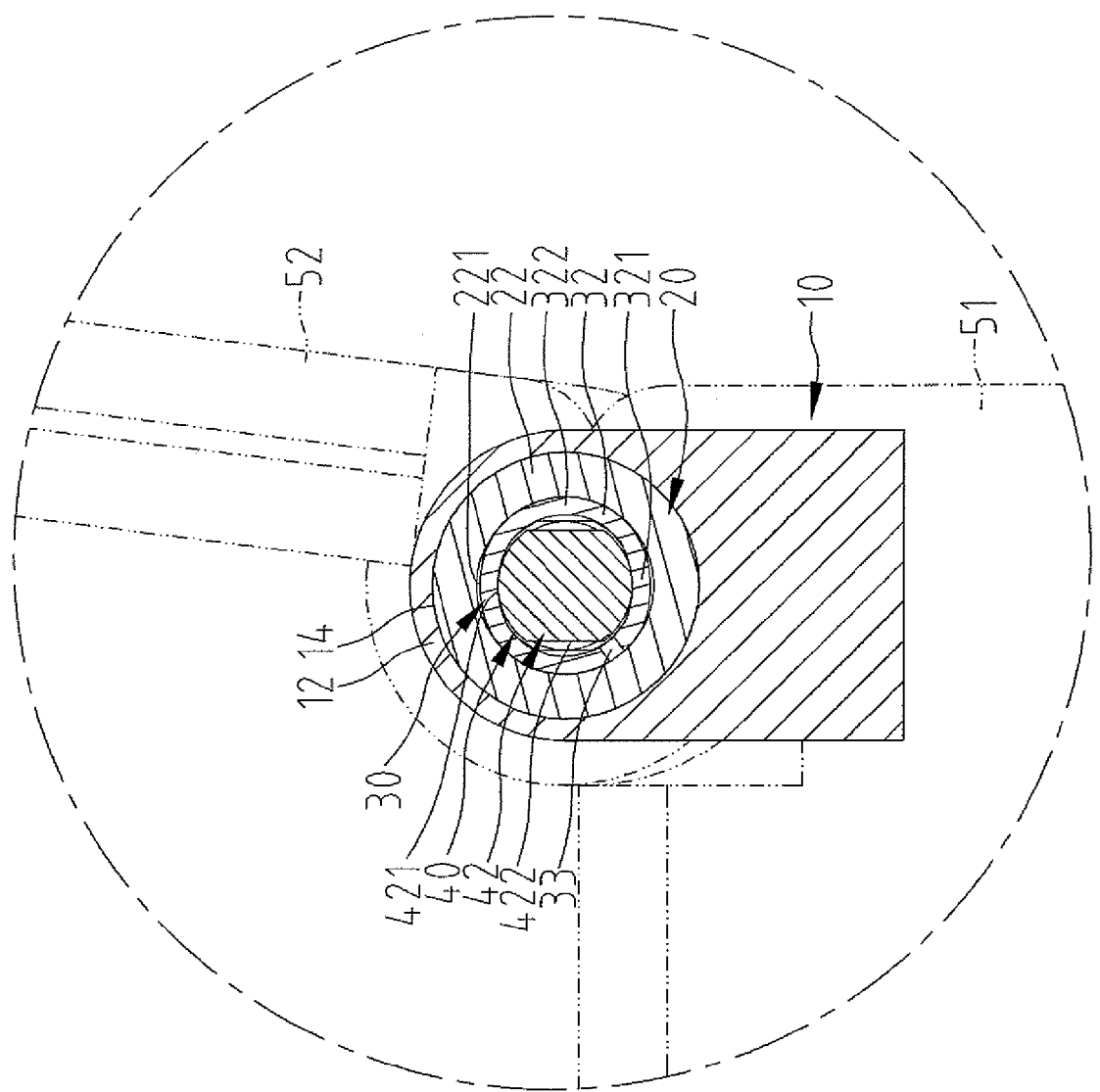
FIG. 10 is a partial, enlarged view of FIG. 8.

Referring to FIG. 10, when the display assembly 52 is rotated open with respect to the base assembly 51, the connecting rod 42 has its cylindrical outer surface 421 engaged with the two first peripheral surfaces 321 of the second portion 32 and four points of contact with the first portion 31 of the elastomeric sleeve 30 respectively. The second portion 32 of the elastomeric sleeve 30 and the slit 33 are expanded out by the connecting rod 421 due to the elastomeric property of the elastometric sleeve 30. The second portion 32 thus has a substantially circular cross section. The resistive force is provided by the interaction of the connecting rod 42 and the first and second portions 31, 32. Accordingly, the resistive force encountered is the greatest.

Figure 11:
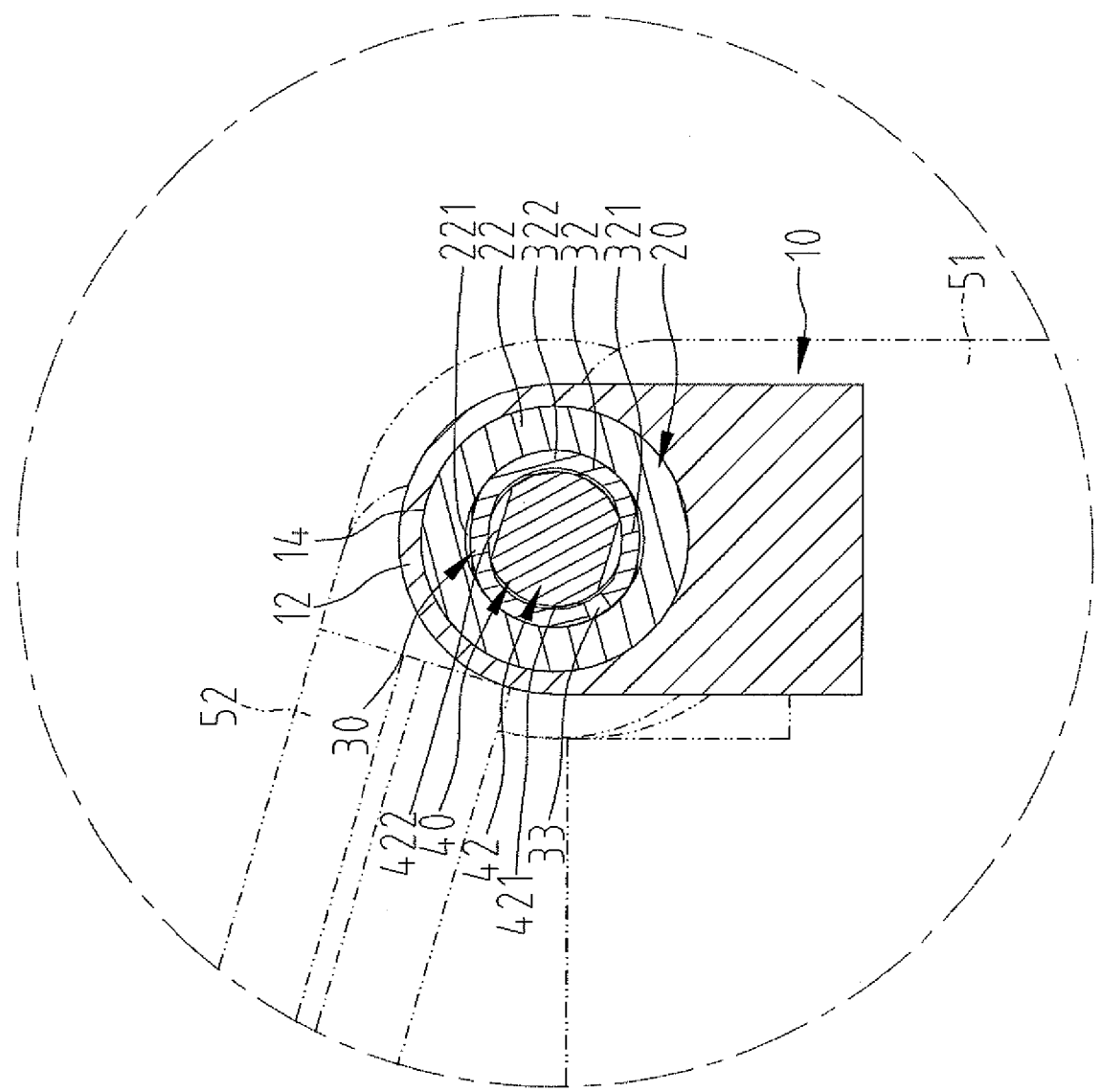
FIG. 11 is a partial, enlarged view similar to FIG. 8, illustrating the notebook computer in another position.

Referring to FIG. 11, when closing the display assembly 52 over the base assembly 51, the connecting rod 42 has its cylindrical outer surface 421 partially engaged with the two first peripheral surfaces 321 of the second portion 32 and four points of contact with the first portion 31 of the elastomeric sleeve 30 respectively. The second portion 32 of the elastomeric sleeve 30 and the slit 33 are less expanded by the connecting rod 42. The resistive force applied by the elastometric sleeve 30 is lower than that of FIG. 10. Accordingly, the notebook computer is easier to move to the closed position and vice-versa.

Figure 12:
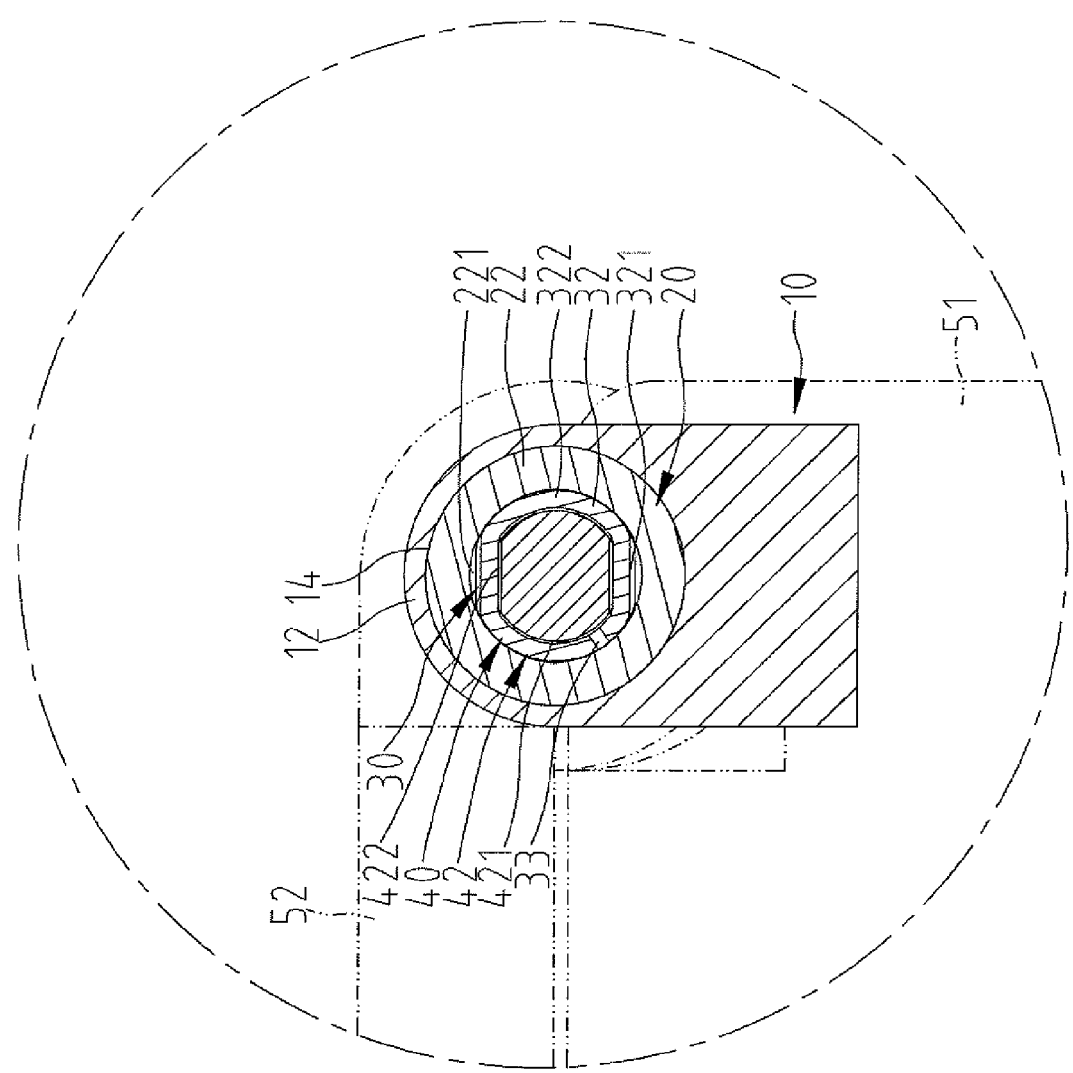
FIG. 12 is a partial, enlarged view of FIG. 9.

Referring to FIG. 12, when the display assembly 52 is closed over the base assembly 51, the connecting rod 42 is not engaged with the second portion 32, and the flat surface 422 corresponds to the first peripheral surface 321 of the second portion 32. However, the connecting rod 42 still has four points of contact with the first portion 31 of the elastomeric sleeve 30. The slit 33 is least expanded, and the resistive force is only provided by the interaction of the connecting rod 42 and the first portion 31.

Figure 13:
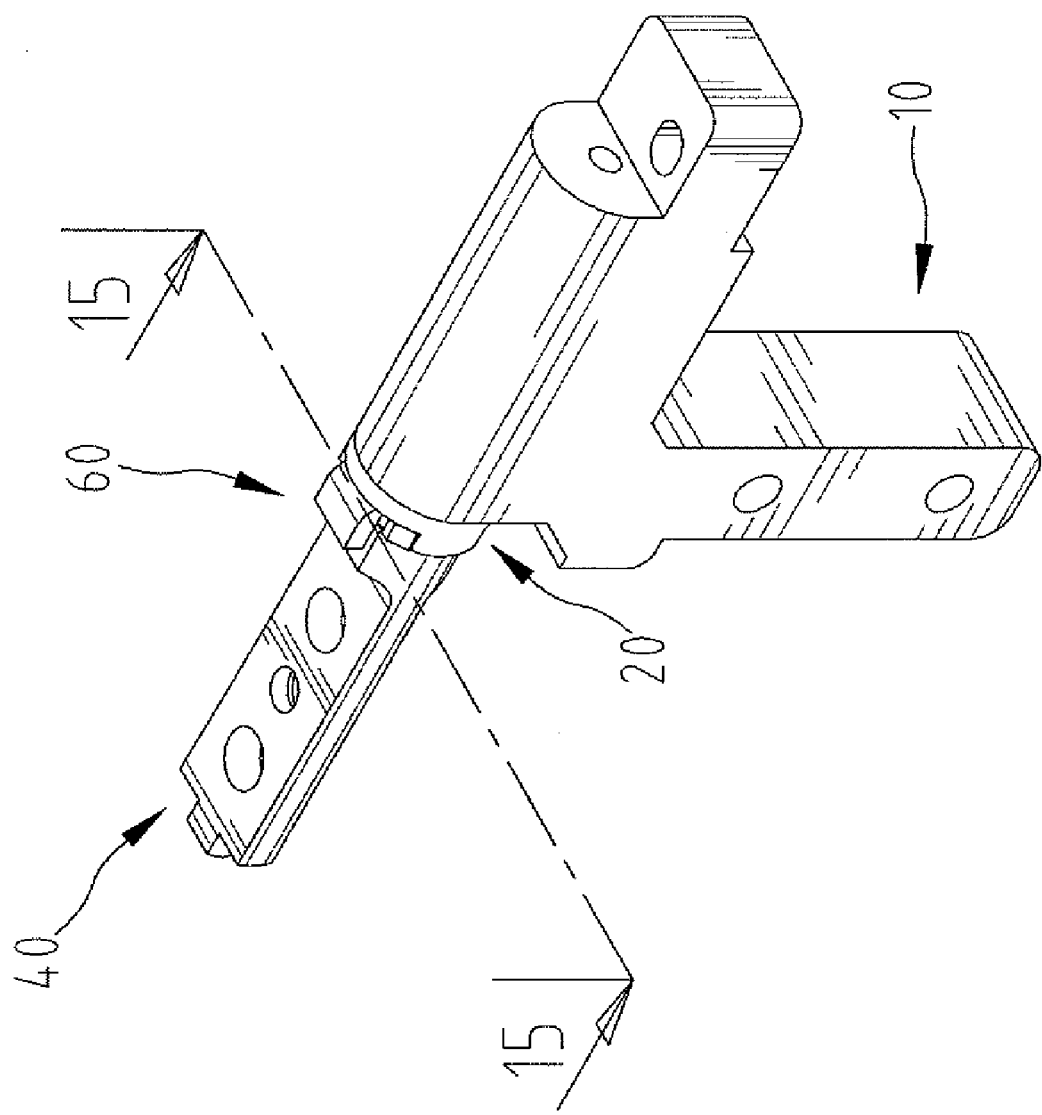
FIG. 13 is a perspective view of a hinge assembly in accordance with the second embodiment of the present invention.
Figure 14:
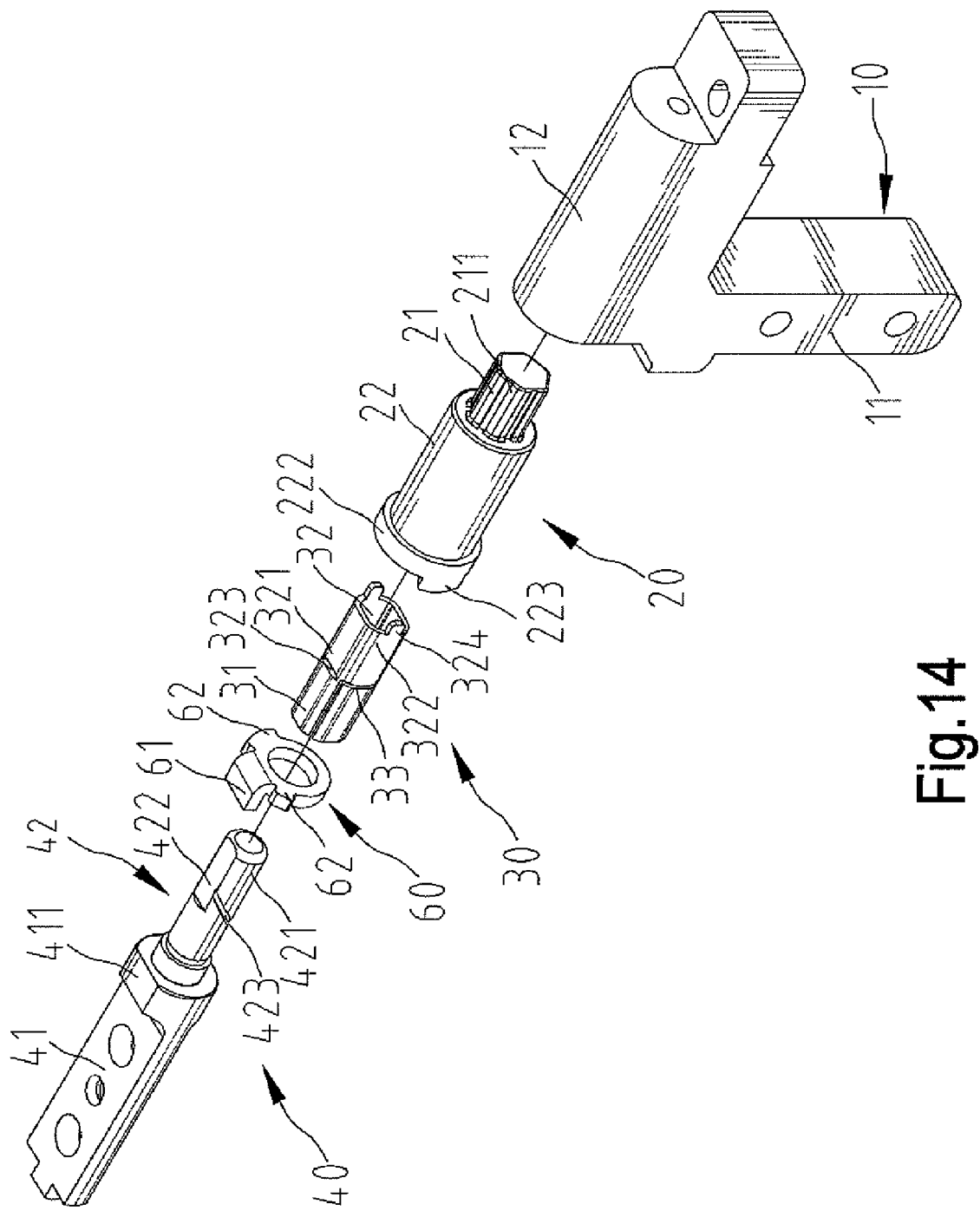
FIG. 14 is an exploded perspective view of FIG. 13.

Referring to FIGS. 13 and 14, a hinge assembly in accordance with the second embodiment of the invention structurally corresponds with the first embodiment with exception that the plug 20 includes a flange 222 and a projection 223 formed thereon. The hinge assembly also includes a positioning device 60 adapted to engage with the flange 222 and the projection 223. Furthermore, the positioning device 60 is adapted for insertion of the pintle 40. The positioning device 60 includes a first tab 61 and two second tabs 62. Furthermore, the mounting tab 41 of the pintle 40 includes a flat surface 411 adapted for receiving the first tab 61 of the positioning device 60. Thus, the positioning device 60 is rotatable with respect to the pintle 40. The flat surface 411 is formed at an end of the mounting tab 41 and is adjacent to the connecting rod 42.

Figure 15:
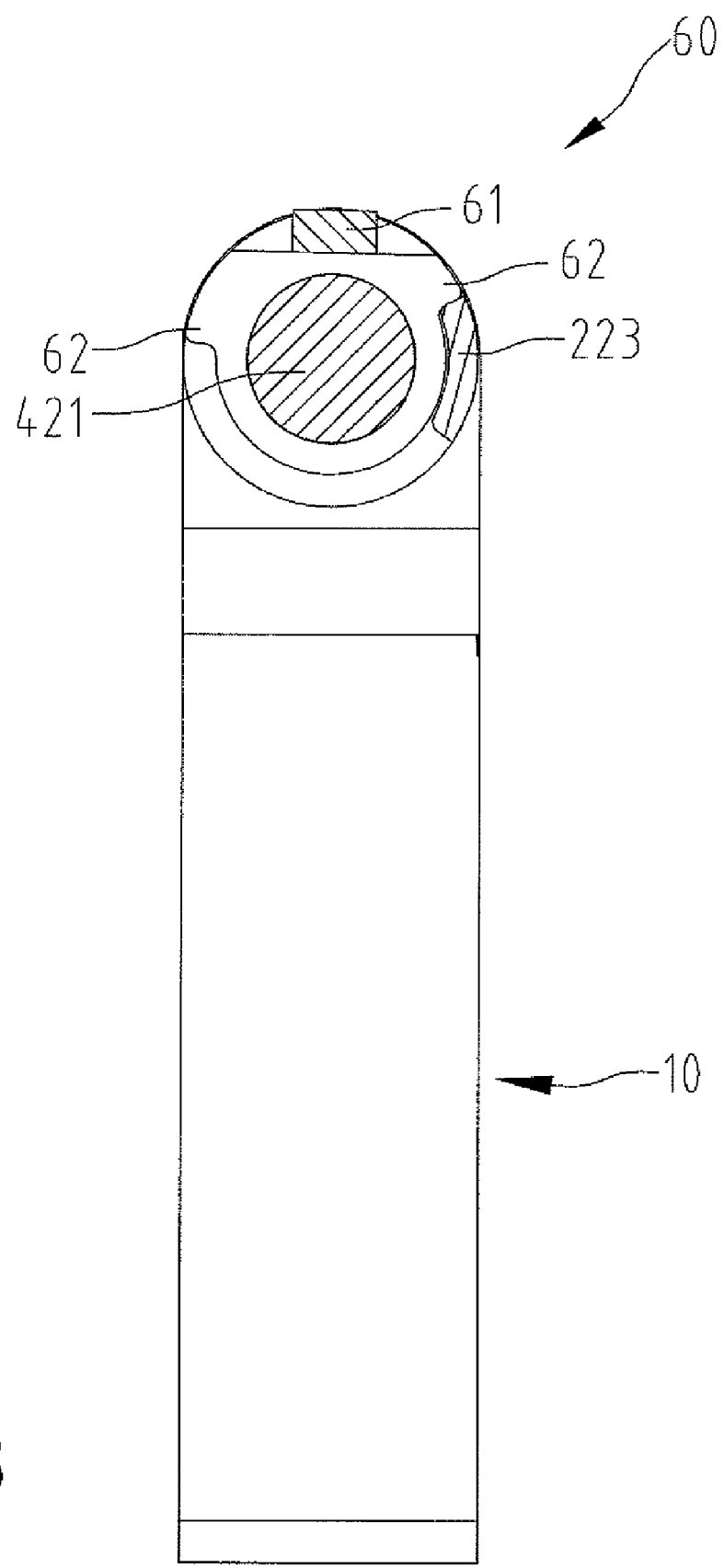
FIG. 15 is a cross-sectional view taken along line 15-15 of FIG. 13.

Referring to FIG. 15, when the display assembly 52 is rotated open with respect to the base assembly 51, the positioning device 60 which rotates with the pintle 40 has one of the second tabs 62 abutted by the projection 223. Accordingly, the display assembly 52 can not be further rotated or pivoted open relative to the base assembly 51.

Figure 16:
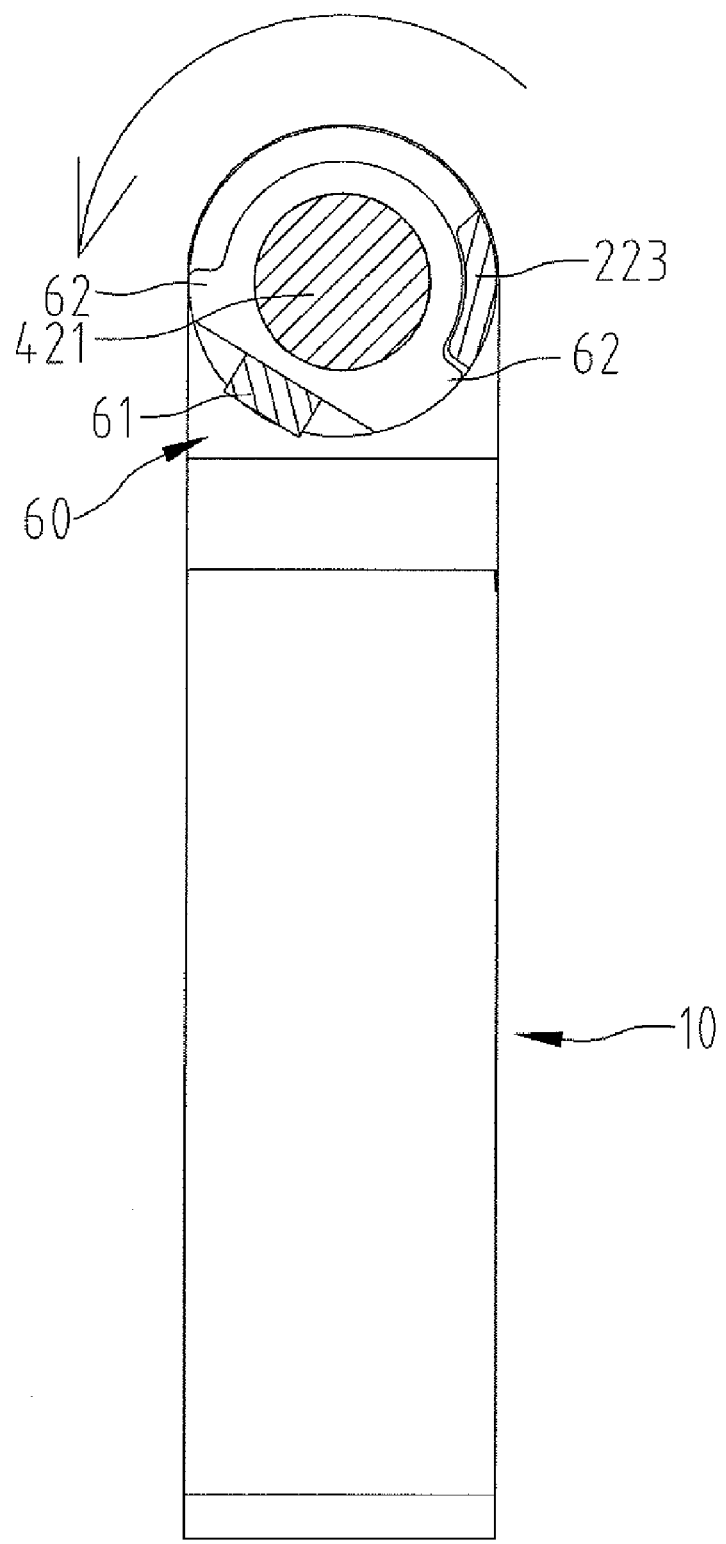
FIG. 16 is a cross-sectional view similar to FIG. 15, illustrating the hinge assembly in another position.

Referring to FIG. 16, when the display assembly 52 is closed over the base assembly 51, the other second tab 62 is abutted by the projection 223.

Figure 17:
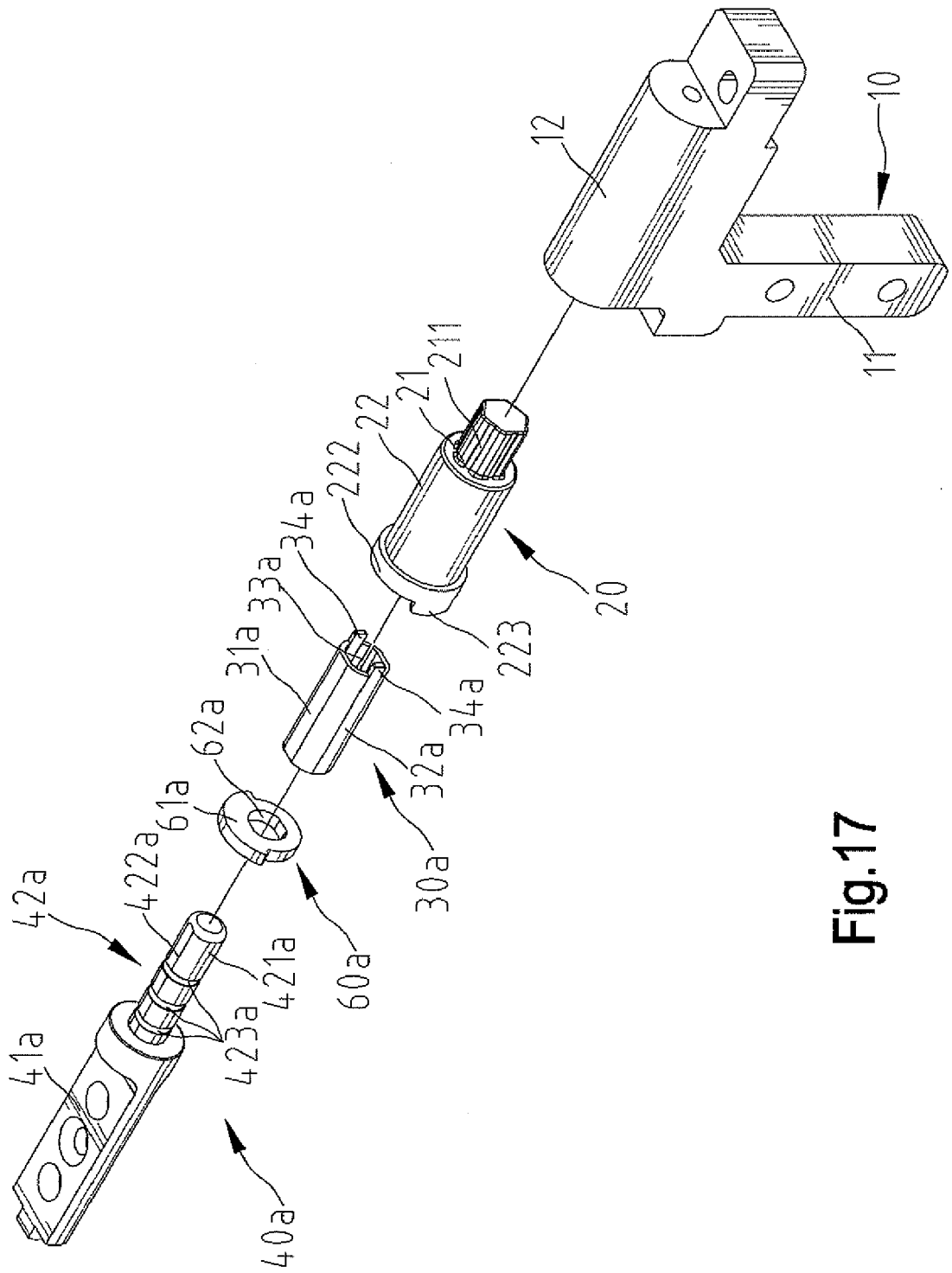
FIG. 17 is an exploded, perspective view of a hinge assembly in accordance with the third embodiment of the present invention.
Figure 18:
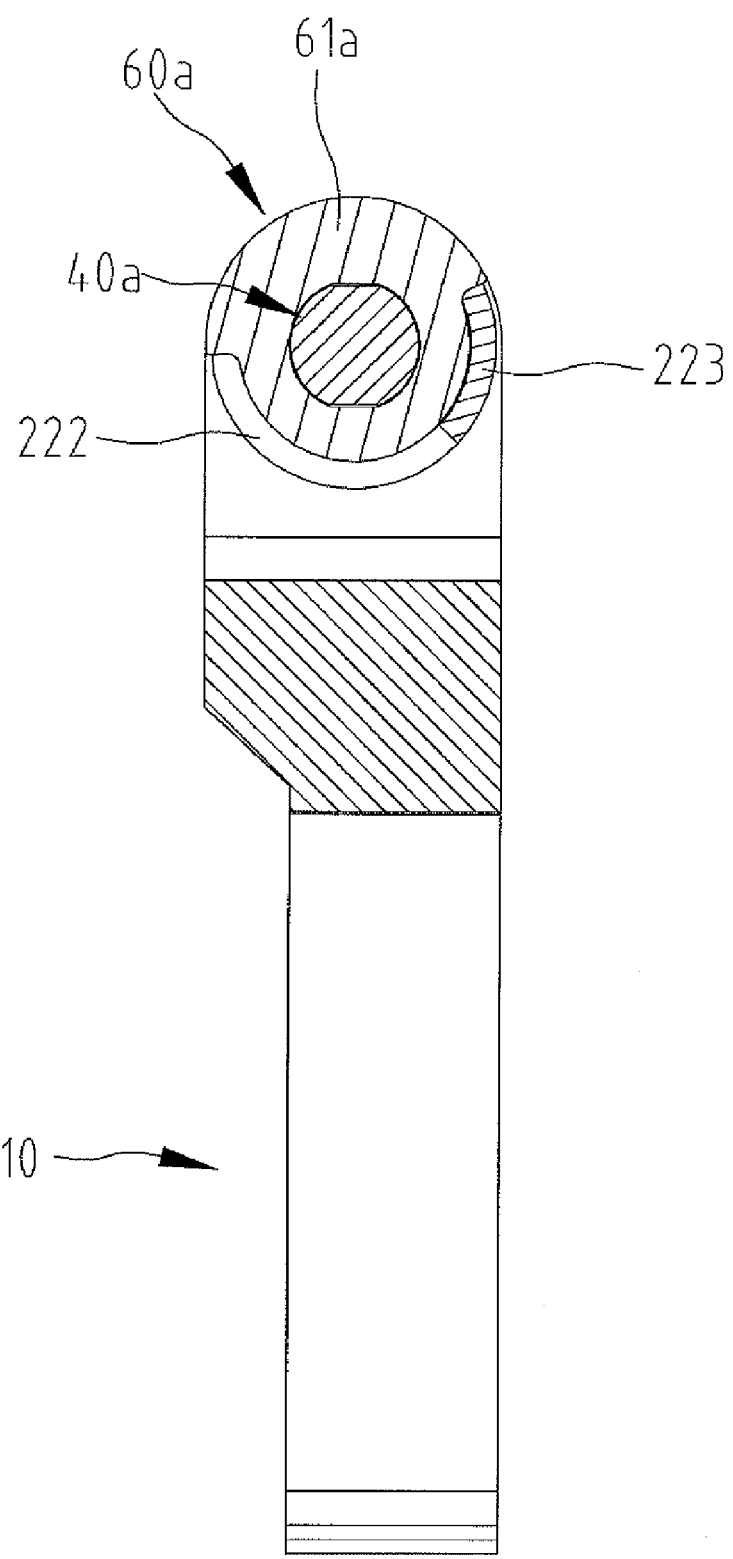
FIG. 18 is a cross-sectional view of the hinge assembly of FIG. 16.

Referring to FIGS. 17 and 18, a hinge assembly in accordance with the third embodiment of the invention is similar to the second embodiment with exception that a positioning device 60a includes a tab 61a adapted to selectively engage with the projection 223 and a through hole 62a that is non-circular. Furthermore, the pintle 40a includes a mounting tab 41a and a connecting rod 42a having a cylindrical outer surface 421a with a flat surface 422a formed along the axis thereof. The pintle 40a also includes three channels 423a disposed transversely in the middle region around the axis of the connecting rod 42a. The channels 423a are parallel to one another. An elastomeric sleeve 30a is also utilized in this embodiment. The elastomeric sleeve 30a includes two, flat, first peripheral surfaces 31a and two, arcuate, second peripheral surfaces 32a. Each second peripheral surface 32a has a protuberance 34a formed thereon. The protuberance 34a is adapted for locking the elastomeric sleeve 30a such that the elastomeric sleeve 30 is not moveable relative to the plug 20. The elastomeric sleeve 30a also includes a slit 33a which is linear and is disposed about the axis thereof.

Figure 19:
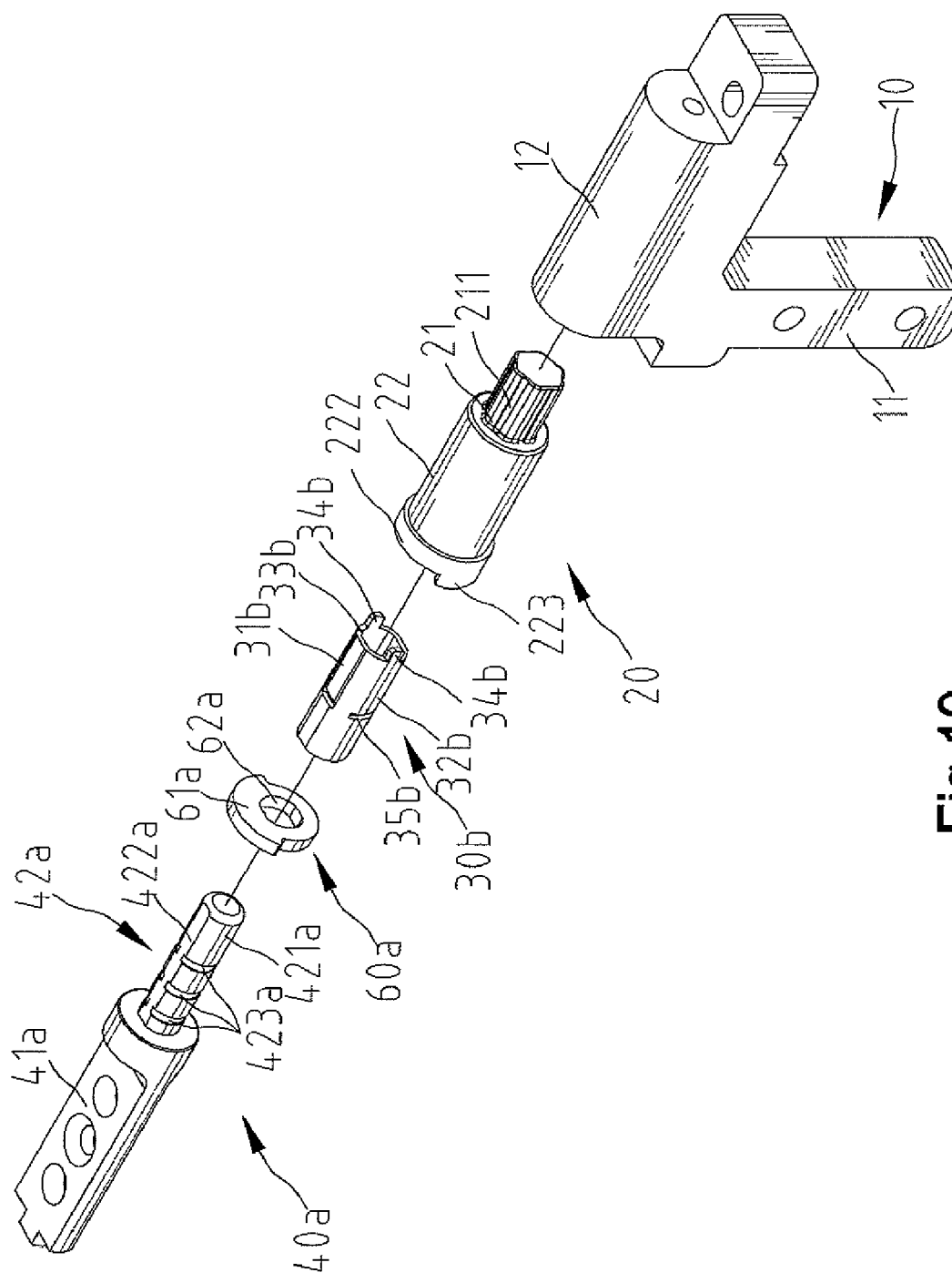
FIG. 19 is an exploded, perspective view of a hinge assembly in accordance with the fourth embodiment of the present invention.

Referring to FIG. 19, a hinge assembly in accordance with the fourth embodiment of the invention is similar to the third embodiment with exception that an elastomeric sleeve 30b includes two, flat, first peripheral surfaces 31b and two, arcute, second peripheral surfaces 32b. Each second peripheral surface 32b has a protuberance 34b formed thereon. The elastomeric sleeve 30b also includes a slit 33b which is linear and is disposed about the axis thereof. Furthermore, a cutout 35b is formed transversely around the elastometric sleeve 30b and disposed in the middle thereof such that the cutout 35b is disposed on both the first and second peripheral surfaces 31b, 32b.

Accordingly, it is one aspect of the hinge assembly that resistive forces are provided by the interaction of the connecting rod 42 and the first and second portions 31, 32 so that the display assembly 52 remains firmly in a desired static position with respect to the base assembly 51.

It is another objective of the present invention that the connecting rod 42 has its cylindrical outer surface 421 partially engaged with the two first peripheral surfaces 321 of the second portion 32 and four points of contact with the first portion 31 of the elastomeric sleeve 30 respectively. Thus, lower resistive forces are provided by the interaction of the connecting rod 42 and the first and second portions 31, 32. As a result, the user can open the notebook computer 50 easily.

It is yet another objective of the present invention to provide the positioning device 60, 60a limiting the opening of the notebook computer 50.

While the specific embodiments have been illustrated and described, numerous modifications come to mind without significantly departing from the spirit of invention, and the scope of invention is only limited by the scope of the accompanying claims.

What is claimed is:

1. A hinge assembly comprising:
a body member including a mounting tab and a housing;
a plug disposed and being locked inside said housing such that said plug is not rotatable relative to the housing;
an elastomeric sleeve being received in said plug, with the elastomeric sleeve including two, flat, first peripheral surfaces, two, arcuate second peripheral surfaces and a slit, with the elastomeric sleeve and the slit being expandable;
a pintle including a mounting tab and a connecting rod, with the connecting rod disposed in said elastomeric sleeve, with the connecting rod including a cylindrical outer surface having a flat surface formed thereon; and
wherein said flat surface corresponds to one of the first peripheral surfaces, said cylindrical outer surface corresponds with the second, arcuate, peripheral surfaces, and said elastomeric sleeve and slit are expanded out by the pintle when the pintle rotates.

2. A hinge assembly as claimed in claim 1 wherein the elastomeric sleeve includes a first portion and a second portion, said elastomeric sleeve has the first, flat, peripheral surfaces and the second, arcuate, peripheral surfaces defined in the second portion, and the connecting rod has the cylindrical outer surface corresponding with the first portion, with the flat surface corresponding with the second portion.

3. A hinge assembly as claimed in claim 2 wherein the first portion has a polygonal cross section and corners that are substantially arcuate.

4. A hinge assembly as claimed in claim 3 wherein the polygonal cross section of the first portion is quadrilateral.

5. A hinge assembly as claimed in claim 2 wherein the first portion and the second portion have a cutout disposed therebetween, and wherein the cutout corresponds with a plane on which the first, flat, peripheral surfaces extend.

6. A hinge assembly as claimed in claim 2 wherein the connecting rod includes a channel formed opposite to the flat surface.

7. A hinge assembly as claimed in claim 2 wherein the slit is disposed in an axial direction of the elastomeric sleeve, with the slit extending from the first portion to the second portion.

8. A hinge assembly as claimed in claim 7 wherein the slit is Z-shaped.

9. A hinge assembly as claimed in claim 2 wherein the first, flat, peripheral surfaces are planar.

10. A hinge assembly as claimed in claim 1 wherein each second, arcuate, peripheral surface includes a protuberance formed thereon for locking the elastomeric sleeve such that the elastomeric sleeve is not moveable relative to the plug.

11. A hinge assembly as claimed in claim 1 wherein the elastomeric sleeve includes a plurality of cutouts disposed transversely in a middle region thereof.

12. A hinge assembly as claimed in claim 1 wherein the connecting rod includes three channels disposed transversely in a middle region thereof, with the three channels being parallel to one another.

13. A hinge assembly as claimed in claim 1 wherein the slit is disposed in an axial direction of the elastomeric sleeve.

14. A hinge assembly as claimed in claim 1 further comprising a positioning device engagable with the pintle, with the positioning device adapted for insertion of the pintle, and wherein the plug includes a flange adapted to engage with the positioning device for limiting a rotational range of the pintle.

15. A hinge assembly as claimed in claim 14 wherein the pintle includes a flat surface defined on the mounting tab, and wherein the positioning device includes a first tab, with the first tab abutting against the flat surface.

16. A hinge assembly as claimed in claim 14 wherein the positioning device includes two tabs, and wherein the flange includes a projection formed thereon.

17. A hinge assembly as claimed in claim 1 wherein the housing includes a first tabular section and a second tabular section therein, and wherein the plug includes a connecting end adapted to be inserted in the first tabular section and a receiving end adapted to be inserted in the second tabular section.

18. A hinge assembly as claimed in claim 17 wherein the connecting end includes a plurality of grooves formed thereon.

19. A hinge assembly as claimed in claim 17 wherein the connecting end is polygonal.

* * * * *